United States Patent [19]

Elward et al.

[11] 4,125,128
[45] Nov. 14, 1978

[54] VENTED BALL-TYPE CUT-OUT COCK

[75] Inventors: Michael P. Elward, Wilkes-Barre;
William K. Mong, N. Huntingdon, both of Pa.

[73] Assignee: Westinghouse Air Brake Company, Wilmerding, Pa.

[21] Appl. No.: 850,128

[22] Filed: Nov. 10, 1977

[51] Int. Cl.² ............................................. F16K 11/06
[52] U.S. Cl. ............................... 137/596; 137/625.22; 251/315
[58] Field of Search ...................... 137/625.22, 625.23, 137/625.24, 596; 251/315

[56] References Cited

U.S. PATENT DOCUMENTS

| | | | |
|---|---|---|---|
| 3,770,016 | 11/1963 | Johnstone | 137/625.22 |
| 3,918,494 | 11/1975 | Dalton | 137/625.23 |

*Primary Examiner*—Alan Cohan

*Attorney, Agent, or Firm*—R. S. Visk; R. W. McIntire, Jr.

[57] ABSTRACT

This invention relates to a vented ball-type cock such as is used at each end of the brake pipe on a railway vehicle in which the brake pipe hose connected to the cock outlet is vented to atmosphere in the cock closed position via a passageway extending through the cock body, the cover therefor and a spiral groove of some suitable configuration formed on a cylindrical stem extending through the cover for rotating a ball-type valve within the cock body between an open and a closed position. A resilient seal obliquely mounted on the stem for rotation therewith is shifted thereby, relative to the cover, from the cock closed position in which a communication between the inlet and outlet of the cock is closed and the hose-venting passageway is open, to the open position in which the communication between the inlet and outlet of the cock is open and the hose-venting passageway is closed.

5 Claims, 4 Drawing Figures

VENTED BALL-TYPE CUT-OUT COCK

BACKGROUND OF THE INVENTION

In U.S. Pat. No. 330,796, issued Nov. 17, 1885 to Harry C. McCarty, assignor of one-half to John F. Bickel, there is shown a cock having a tapered-type cock key that is provided with a transverse passageway and a port that extends through the side of the cock key and opens into the transverse passageway. This tapered key is rotatably mountd in a body having a port provided in one side thereof. In the closed position of the key, the passageway and port therein are so disposed that the passageway is disposed in coaxial alignment with the port in the side of the cock body to thereby establish a communication between the interior of an air brake hose connected to the outlet end of the cock body and atmosphere via this passageway and port in the key and the port in the cock body. Thus, the fluid under pressure in the air brake hose is vented to atmosphere via this communication when the cock key is rotated to a closed position in which communication between the interior of the brake pipe and the interior of the hose is cut off.

Many American railroads on certain of their freight cars require a cock that, when in its closed position, establishes a communication between the interior of the air brake hose connected to the outlet of the cock secured to each respective end of a brake pipe that extends from end to end of each car and atmosphere. However, the tapered-type cock key shown in the above-mentioned U.S. Pat. No. 330,796 has been largely replaced by a ball-type valve that requires considerably less maintainence by the railroads.

Accordingly, it is the general purpose of this invention to provide a ball-type cock having novel means for venting fluid under pressure from the interior of an air brake hose connected to the outlet of such a cock upon turning the handle of this cock to its closed position in which the communication between the brake pipe and the interior of this air brake hose is closed.

SUMMARY OF THE INVENTION

According to the present invention, a novel ball-type cock comprises a ball-type valve rotatably mounted within a pair of resilient ball seat seals disposed within a hollow body for rotation within these seals by a cylindrical valve stem that extends through a cock body cover and has a tongue that at one end is disposed within a slot or groove provided therefor in the ball valve. When the ball-type valve is rotated by a handle secured to the valve stem to its valve-closed position, passageways provided in the cock body and its cover are aligned with a spiral-type groove formed on the periphery of the cylindrical valve stem to establish a communication that is open to atmosphere. The communication thus established enables the release of all fluid under pressure from the interior of an air brake hose connected to the outlet of the cock body prior to uncoupling the hose coupling at the exterior end of this hose from a like hose coupling at the exterior end of the hose at the adjacent end of the net vehicle in a train of railway vehicles.

DESCRIPTION

Figure 1:
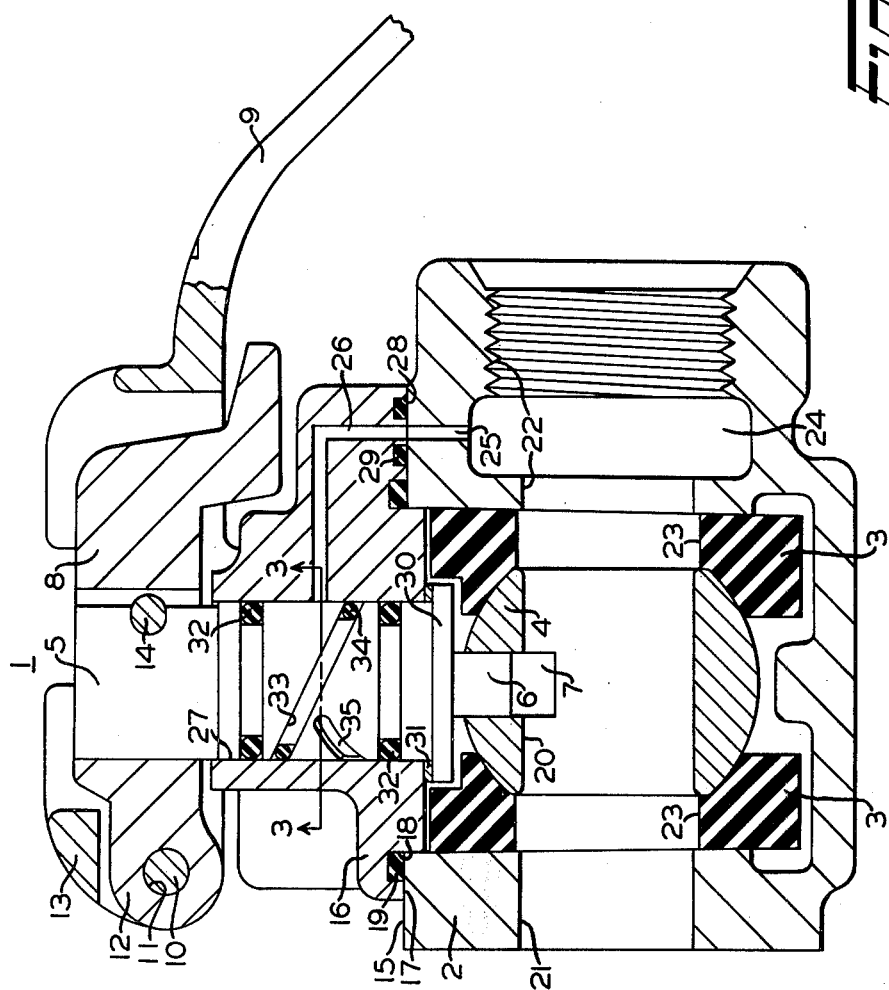
FIG. 1 is a longitudinal cross-sectional view of a ball-type cock showing a ball-type valve in its valve-open position and a hose-venting communication therein closed.

As shown in the drawing, a ball-type cock is denoted by the reference 1. This cock 1 comprises a hollow housing or body 2, a pair of identical resilient ball seat seals 3 disposed within the hollow body 2, a ball-type valve 4 mounted for rotation within the seals 3, a cock key or valve operating stem 5 that has a tongue 6 at one end which extends into a slot or groove 7 provided therefor in the ball valve 4, a handle socket 8 through which extends the other end of the key 5, and a handle 9. This handle 9 is pivotally mounted on a pin 10 that extends through a bore 11 in a lug 12 that is integral with one side of the handle socket 8 and a pair of coaxial bores provided in the arms of a clevis 13 which is integral with one end of the handle 9. The handle socket 8 is rigidly secured to the cock key 5 by a rivet 14 thereby enabling rotation of the handle socket 8, cock key 5 and ball valve 4 by means of the handle 9 between an open position in which the ball valve 4 is shown in FIG. 1 and a closed position in which it is shown in FIG. 2.

The ball seat seals 3 may be the same as those shown and described in U.S. Pat. No. 3,498,585, issued Mar. 3, 1970 to Fred Temple et al, and assigned to the assignee of the present invention, and, therefore, need not be described in detail herein.

The hollow body 2 may be a casting which, subsequent to removing it from the mold in which it is cast in a foundry, has a flat surface 15 formed thereon by, such as, for example, a cutting tool of a planar.

Figure 2:
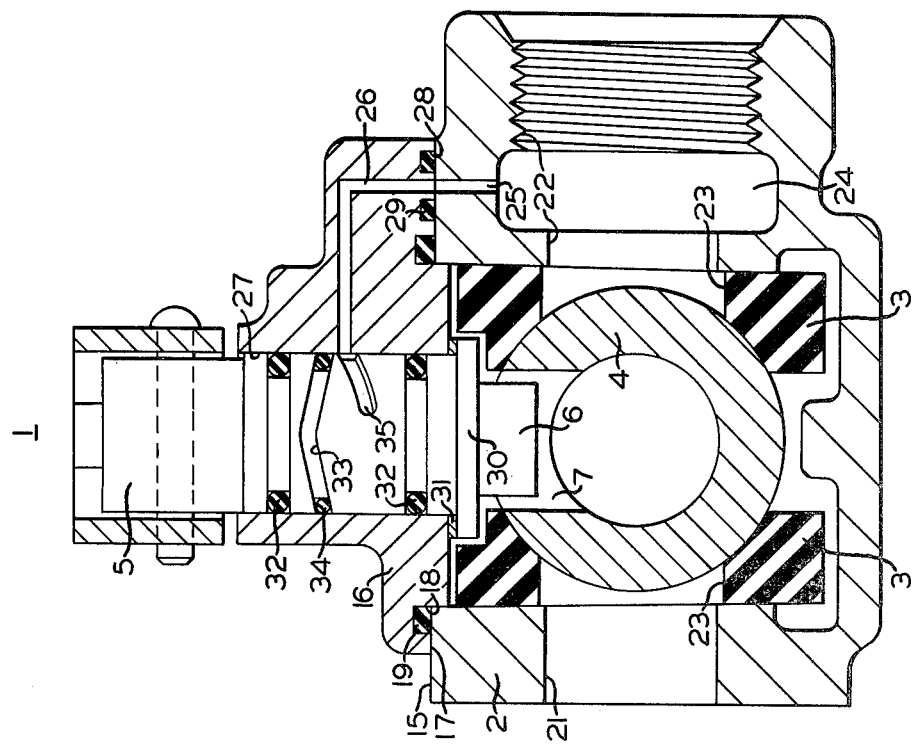
FIG. 2 is a longitudinal cross-sectional view of the ball-type cock shown in FIG. 1 showing the ball-type valve in its valve-closed position and the hose-venting communication therein open.

As shown in FIGS. 1 and 2, a cover member 16, that also may be a casting having thereon a machined flat surface 17 that abuts the flat surface 15, is mounted on the top of the body 2 and secured thereby by any suitable means (not shown). Provided in the flat face 17 on the cover member 16 is a first annular groove 18 in which is disposed a resilient annular seal 19 that forms a seal with the flat surface 15 on the hollow body 2 to prevent leakage of fluid under pressure from the interior of this body 2 to atmosphere.

As shown in FIG. 1 of the drawings, the ball valve 4 is provided with a circular pasageway 20 that extends therethrough. When the ball valve 4 is rotated by means of the handle 9 through an angle of 90° from its closed position in which it is shown in FIG. 2 to its open position in which it is shown in FIG. 1, this passageway 20 establishes a communication between an inlet passageway 21 in the body 2 and an outlet passageway 22 in this body, it being noted that each of the ball seat seals 3 is provided with a bore 23 that is coaxial with the circular passageway 20 in the ball valve 4 while this ball valve occupies its open position.

One end of the usual brake pipe (not shown) that extends from end to end of a railway vehicle is connected to the inlet passageway 21 and one end of the usual air brake hose (not shown) is connected to the outlet passageway 22. Accordingly, it is apparent that while the ball valve 4 occupies its open position, as shown in FIG. 1, fluid under pressure may flow from the brake pipe to the interior of the air brake hose. The other end of this air brake hose is provided with a coupling that is coupled to a like coupling on one end of a like air brake hose that is connected to the outlet passageway of the cock secured to the adjacent end of the brake pipe that extends from end to end of the next vehicle in the train, it being understood that the adjacent ends of two adjacent railway vehicles are coupled by the couplers at these adjacent ends of the two adjacent railway vehicles.

Referring to FIGS. 1 and 2 of the drawings, it will be noted that the body 2 has cast therein intermediate the ends of the outlet passageway 22 an annular cavity 24 into which opens one end of a passageway 25 that extends through the body 2 and at its other end opens at the flat surface 15 on this body 2.

As further shown in FIGS. 1 and 2, the cover member 16 is provided with a passageway 26 that at one end opens at the flat surface 17 on this cover member 16 in such a location as to be in alignment with the above-mentioned other end of the passageway 25 in the body. This passageway 26 extends through the cover member 16 and at its other end opens at the wall surface of a bore 27 that extends vertically, as viewed in FIGS. 1 and 2, through the cover member 16, it being noted that the center line of this bore 27 is coaxial with a vertical center line passing through the center of the ball valve 4.

Moreover, as shown in FIGS. 1 and 2, the valve operating stem or key 5 is rotatably mounted in this bore 27.

In order to prevent leakage of fluid under pressure from the passageways 25 and 26 to atmosphere, the cover member 16 is provided with a second annular groove 28 that extends inward from the flat surface 17 and has a resilient annular seal 29 disposed therein that forms a seal with the flat surface 15 on the hollow body 2.

As shown in FIGS. 1 and 2, the valve operating stem 5 is provided just above the tongue 6 with a collar 30 between which and the cover member 16 is disposed an annular wear ring or washer 31.

As further shown in FIGS. 1 and 2, the valve operating stem 5 is provided with two spaced-apart grooves in each of which is disposed an O-ring seal or sealing element 32 that forms a seal with the wall surface of the bore 27 respectively above and below the location at which the passageway 26 opens at the wall surface of this bore 27.

Furthermore, the valve operating stem 5 is provided with an oblique groove 33 of such a configuration as to receive a resilient seal member 34 that is obliquely mounted therein so as to form a seal with the wall surface of the bore 27.

The valve operating stem 5 is further provided between the lower O-ring seal 32 and the obliquely mounted seal member 34 with a spiral groove 35 that extends one fourth around the operating stem 5.

This spiral groove 35 may be formed on the valve operating stem 5 by clamping this stem in a chuck that is so mounted on the table of a milling machine that the chuck can be slowly rotated by an indexing head as the chuck is moved longitudinally along the table. Therefore, a revolving milling cutter of the milling machine can be positioned so that it will mill or cut the groove 35 on the stem 5 as this stem 5 and the chuck are advanced along the table and simultaneously rotated through an angle of 90°.

Figure 3:
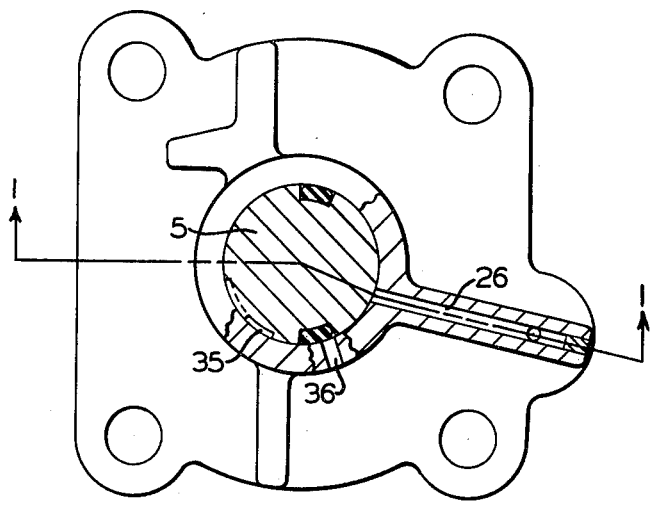
FIG. 3 is a top view of the cock shown in FIG. 1 with the handle removed and a part of the cock cover broken away to show certain details not made apparent in FIGS. 1 and 2.

As shown in FIGS. 1 and 3, the groove 35 and seal member 34 are so located that, while the stem 5 and ball valve 4 occupy the valve-open position shown in FIG. 1, the seal member 34 closes communication between the passageway 26 and the groove 35 and this groove 35 is out of alighment with a vent port 36 in the cover member 16, it being understood that vent port 36 is not in the plane of line 3—3 in FIG. 1 but opens at one end at the wall surface of the bore 27 at a location that is vertically below the location at which the above-mentioned other end of the passageway 26 opens at the wall of this bore 27. Accordingly, this port 36 is shown broken away in FIGS. 3 and 4.

Figure 4:
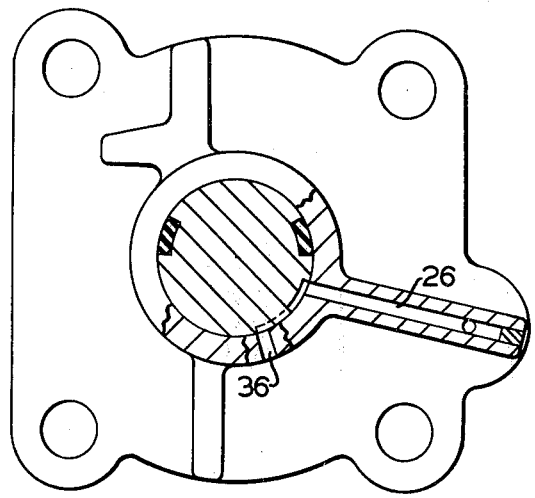
FIG. 4 is the same as FIG. 3 except the valve stem has been rotated through an angle of 90°.

When the ball-type valve 4 and operating stem 5 are rotated by means of the handle 9 from the open position of the valve 4 shown in FIG. 1 to the closed position in which it is shown in FIG. 2, the upper end of the groove 35 will be in alignment with that end of the passageway 26 that opens at the wall surface of the bore 27 and the lower end of this groove 35 will be in alignment with the vent port 36, as illustrated in FIG. 4. Accordingly, the fluid under pressure in the outlet passageway 22 and the air brake hose connected thereto will flow to atmosphere via the cavity 24, passageways 25 and 26, groove 35 and vent port 36.

Thus, the hose couplings of two coupled hose at the adjacent ends of two railway vehicles in a train may be manually uncoupled without the trainman performing this work being subject to a blast of high pressure air from the two hoses when their couplings ar uncoupled.

Having now described the invention, what we claim as new and desired to secure by Letters Patent, is:

1. A cock comprising:
 (a) a hollow housing having a pair of fluid flow passage ways opening thereinto to which may be connected respectively an inlet conduit and an outlet conduit and, wherein the improvement comprises, a vent passageway open at one end into that one of said fluid flow passageways to which said outlet conduit may be connected and at the other end to the exterior of said housing,
 (b) a pair of ball seat seals disposed in said hollow housing in opposite spaced-apart relationship and each having a through bore that at one end is in alignment with one end of one of said pair of fluid flow passageways in said housing, the opposite end being provided with a spherical seat,
 (c) a ball valve element having a passageway extending therethrough and so positioned between said ball seat seals in sealing relationship with said spherical seat on each respective ball seat seal as to, in an open position of said valve element, establish a communication between said inlet conduit and said outlet conduit,
 (d) a cover member for said hollow housing and having therein a bore, a vent port and a passageway that at one end opens at the wall surface of said bore and at the other end in such a location as to be in alignment with said other end of said vent passageway in said hollow housing,
 (e) a valve stem rotatably mounted in said bore in said cover member and separably connected to said ball valve element for effecting rotation of said valve element between said open position and a closed position in which said communication is closed, said valve stem having provided thereon a spiral groove that extends around one fourth of its circumference and is so obliquely disposed that, upon rotating said valve element to its said closed position by said valve stem, one end of said spiral groove is in alignment with said one end of said passageway in said cover member and the other end is in alignment with said vent port in said cover member whereby a venting communication is established between said outlet conduit and atmosphere.

2. A ball-type cock, as recited in claim 1, further characterized by sealing means carried by said valve stem and so obliquely disposed with respect thereto as to, while in said open position of said valve element, so form a seal with the wall surface of said bore in said cover member as to close communication between said passageway and said vent port in said cover member.

3. A ball-type cock, as recited in claim 1, further characterized in that the axes of said vent port and said one end of said passageway in said cover member lie in separate parallel planes.

4. A ball-type cock, as recited in claim 2, further characterized by a pair of sealing elements carried by said valve stem and so spaced-apart that one is located on said stem above said obliquely disposed sealing means and the other is located below said sealing means, said one of said pair of sealing elements forming a seal with the wall surface of said bore in said cover member to prevent leakage of fluid under pressure from said passageway in said cover member to atmosphere, while said ball valve element is in its said open position, and said other of said pair of sealing elements forming a seal with the wall surface of said bore to prevent leakage of fluid under pressure from said passageway in said valve element to said vent port in said cover member.

5. A ball-type cock, as recited in claim 4, further characterized in that said one sealing element, by forming said seal with the wall surface of said bore in said cover member, prevents subjecting said sealing means to damage by contaminants entering the exterior end of said bore in said cover member.

* * * * *